March 4, 1969 R. W. MARTIN 3,431,431

SWITCHING APPARATUS

Filed Dec. 23, 1965

INVENTOR
ROBERT W. MARTIN

By John H. Holcombe

ATTORNEY

United States Patent Office 3,431,431
Patented Mar. 4, 1969

3,431,431
SWITCHING APPARATUS

Robert W. Martin, San Jose, Calif., assignor to International Business Machines Corporation, Armonk, N.Y., a corporation of New York Filed Dec. 23, 1965, Ser. No. 527,402
U.S. Cl. 307—136 5 Claims
Int. Cl. H02h 3/08, 7/00; H01h 33/44

ABSTRACT OF THE DISCLOSURE

A switching apparatus for selectively switching the output of a single shot to a selected output terminal after a predetermined delay. A plurality of pairs of switching contacts are employed each selectively movable from a closed to an open position. The contacts are connected in series and to the input of a delay means. A plurality of output contacts are employed, one for each of the switching contacts which are operatively connected to a signal source in response to opening of the corresponding pair of switching contacts. The delay means is responsive to the opening of one of the pairs of switching contacts to actuate the signal source providing an output signal to the corresponding output terminal a predetermined time after the opening of the corresponding switching contacts.

Figure 1:
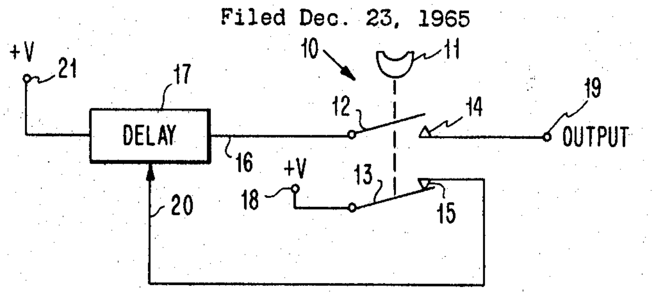

This invention relates to electromechanical switching apparatus, and more particularly to apparatus for preventing the effects of "contact bounce" of electromechanical switches.

When any mechanical switch is closed, there is a certain amount of imperfect electrical contact between the contacting points. This generates a distortion in the initial portion of the electrical signal transmitted by the switch, and is called "contact bounce."

The distortion caused by contact bounce can interfere with the operation of circuits whose inputs are connected to the switch. For example, the distorted signal may cause electronic trigger circuits to be triggered more than once by a single operation of the switch.

The problem of contact bounce is one of long standing, and a number of techniques have been utilized to reduce the effects thereof. For example, the input of each switch may be connected to a common power supply and the output of each switch connected to a separate integrating circuit composed of a heavy duty diode and an RC network. The integrating network thus tends to even out the contact bounce distortion, but completely changes the character of the output signal by integrating it. Further, the high cost of such an integrating circuit for each switch is evident.

In another example, the individual integrators are replaced by a series of logic circuits. The output contact of each switch is connected to an input of a common OR circuit which fires a single-shot multivibrator to provide a sufficient delay for cessation of contact bounce. The output of this multivibrator operates a second single-shot multivibrator which generates a strobe pulse feeding one side of each of a series of AND circuits. The other side of each AND circuit is connected to one of these switch outputs. The AND circuit of the operated switch thereby gates the strobe pulse onto the output line, serving as the final switch output signal. The high cost for the complicated logic is evident. Additionally, such a circuit operates to provide a logical pulse output, no longer than the duration of the multivibrator output, but is not adapted to transmit a signal from the switch input.

An additional disadvantage of the circuitry shown by the above examples of the prior art is that the switch contacts transmit power during the period of contact bounce, thereby fostering arcing which shortens the life of the contacts.

Therefore, an object of the present invention is to provide apparatus for supplying outputs from electromechanical switches free of the effects of contact bounce.

Another object of the present invention is to provide apparatus for electromechanical switches eliminating the need for integrating or delay and gating devices for the output for every switch.

Still another object of the present invention is to provide electromechanical switching apparatus for providing, upon actuation, a signal at the output thereof for feeding logic circuits directly.

Yet another object of the present invention is to provide apparatus preventing the transmission of power by the contact points of an electromechanical switch during the period of contact bounce.

The invention comprises basically sensing means responsive to the impending closing of an electromechanical switch for interposing a delay in the application of an electrical signal to the contact points constituting a predetermined time, so that a signal is not applied to the contact points until after the period of contact bounce.

A further aspect of the present invention comprises sensing means responsive to the impending closing of an electromechanical switch for supplying an electrical signal to the contact after a predetermined time, so that application of the signal to the contact points is delayed until after the period of contact bounce.

An additional aspect of the present invention comprises circuitry utilizing a single delay means or signal means to provide the delay in application of the signal to multiple switch outputs.

An advantage of the present invention is that the logic circuits employed in creating the delay make it easy to inhibit all switch outputs or to time the switch outputs by adding one or more gate lines.

The foregoing and other objects, features and advantages of the invention will be apparent from the following more particular description of preferred embodiments of the invention, as illustrated in the accompanying drawings.

Figure 2:
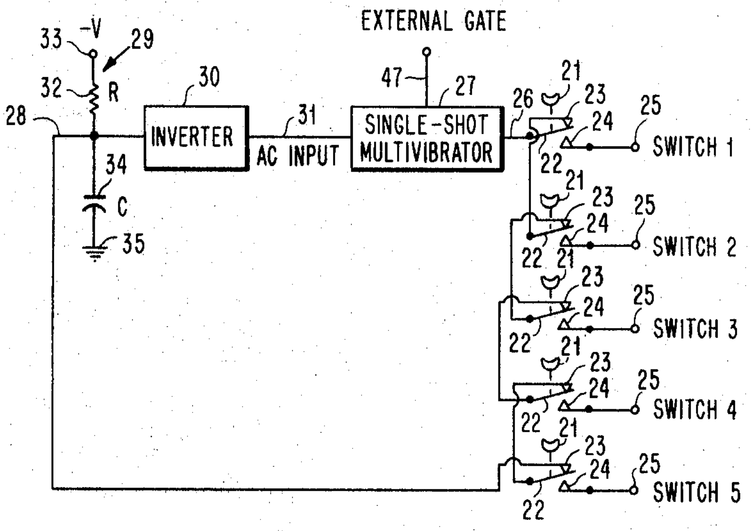
Figure 3:
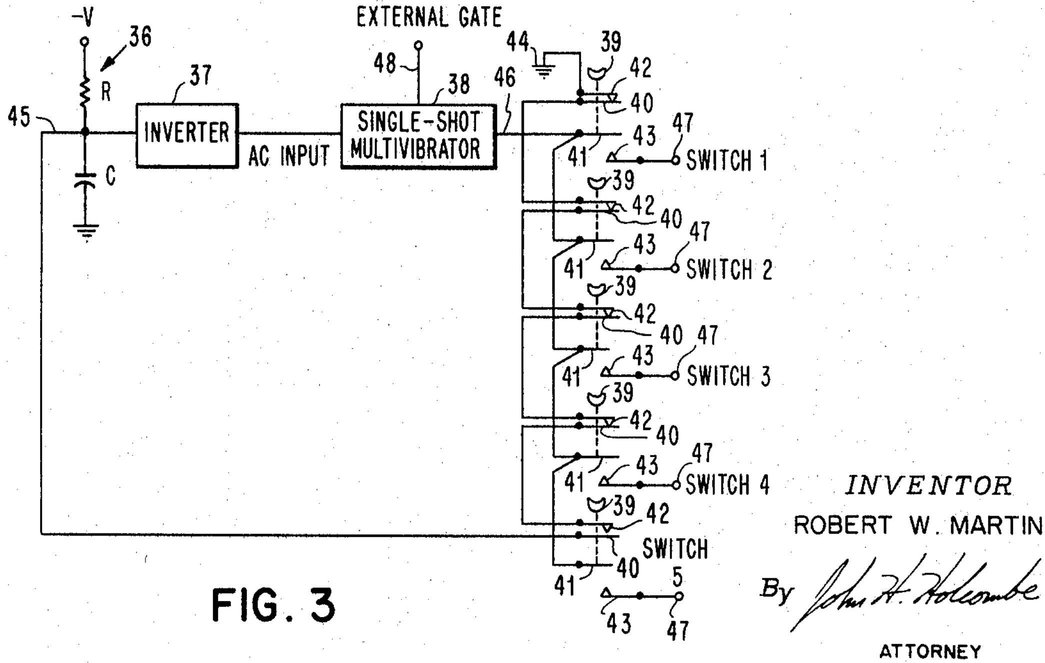

FIGURE 1 comprises a circuit diagram of the simplest embodiment of the invention;

FIGURE 2 comprises a circuit diagram of the second embodiment of the invention; and FIGURE 3 comprises a circuit diagram of a third embodiment of the invention.

Referring to FIGURE 1, an electromechanical switch 10 is shown having a manually operated, push-type key 11 connected to movable contacts 12 and 13. Stationary contacts 14 and 15 are arranged such that when a key 11 is not operated, movable contact 13 is connected to stationary contact 15, and when the key 11 is operated downward, movable contact 12 is connected to stationary contact 14. The switch 10 is shown as a manually operated switch, but any suitable electromechanical switch is contemplated, such as a relay or other means.

Movable contact 12 is connected to the output 16 of a delay means 17 and movable contact 13 is connected to a voltage source 18. Stationary contact 14 is connected to output terminal 19, and stationary contact 15 is connected to the operating input 20 of the delay 17. The gated input to delay circuit 17 is connected to a voltage supply 21.

The object of switch 10 and delay 17 is to provide, upon operation of key 11, an output at terminal 19 which does not suffer from the effects of contact bounce.

Therefore, common contact 13 acts as a sensing means for detecting the impending connection of movable contact 12 to stationary contact 14 and operates the delay means 17 to thereby delay the application of an output signal to contact 12 until after the period of contact bounce.

In the example of FIGURE 1, the signal to be transmitted by switch 10 comprises merely a positve voltage +V at terminal 21. Delay means 17 comprises any suitable means which responds to removal of the voltage input +V from terminal 18 by delaying the application of the signal from terminal 21 to line 16 for a predetermined time. An example of such delay means comprises an AND gate controlled by input line 20, the output of which is connected to a conventional delay line for providing a delay of predetermined duration. Another example comprises a blocking circuit operated by an input on line 20 to prevent a signal from terminal 21 from reaching line 16 and a single-shot multivibrator, also controlled by input line 20, to provide an output a predetermined time later to the blocking circuit, thereby unblocking the circuit to allow transmission of a signal from terminal 21 to switch 10.

Thus, in the example of FIGURE 1, switch 10 is normally up so that contacts 12 and 14 are open and contacts 13 and 15 closed. Voltage potential +V from terminal 18 is thereby transmitted by contacts 13 and 15 to input line 20 of delay 17.

When key 11 is pressed, contacts 13 and 15 immediately open, removing the potential from line 20. The change in potential operates delay means 17 to delay the application of the signal from terminal 21 to line 16 until a predetermined time later. Therefore, no potential is present on line 16, and there is no potential difference between contacts 12 and 14. As key 11 is depressed further, contacts 12 and 14 gradually close and undergo the period of imperfect contact until finally settling into the closed condition of perfect contact. During the "contact bounce" period, no arcing nor imperfect transmission is accomplished between contacts 12 and 14 because no signal is applied to line 16.

Then, the predetermined delay of delay means 17 ends the signal from terminal 21 and is transmitted therethrough to line 16. The signal is then transmitted perfectly by contacts 12 and 14 to output terminal 19.

Another embodiment of the invention is shown in FIGURE 2, when one of five switches may be operated at one time without producing the effects of a contact bounce at an output.

Each switch is of the single-pole, double-throw type and includes a key 21, a common contact 22, a normally closed stationary contact 23 and a normally open stationary contact 24. The normally open contact of each of the switches is connected to an output terminal 25.

The switches are connected in series via the normally closed contacts between output 26 of single-shot multivibrator 27 and input 28 of RC network 29. The RC network is connected via an inverter 30 to the AC input 31 of single-shot multivibrator 27.

RC network 29, inverter 30 and single-shot multivibrator 27 comprises another example of a delay means 17 specified in FIGURE 1. The function of the delay means in FIGURE 2 is the same as that in FIGURE 1, and therefore any suitable delay means may be substituted for circuits 29, 30 and 27 of FIGURE 2.

The RC network 29 includes a resistor 32 connected to ground terminal 35. The single-shot multivibrator 27 comprises any suitable multivibrator which is AC coupled on the input 31 and requires a positive transition for firing. In its stable "off" state, the multivibrator output is at ground potential or "up." When triggered, the multivibrator provides a negative pulse of predetermined amplitude and duration on output 26.

The operation of the circuit of FIGURE 2 is similar to that of FIGURE 1 except that five serially connected switches are provided. Normally closed contacts 23 of each of the switches comprises the sensing means to detect the impending connection of movable contact 22 to stationary contact 24.

When all of the switches are in the normal state, contacts 22 and 23 are closed and the ground potential output from multivibrator 27 is transmitted serially therethrough to input 28 of the delay network. The capacitor 34 is therefore held at ground potential and provides this potential to inverter 30. The output of the inverter is therefore at negative potential or "down."

When one of the switches is operated by being pressed downward, common contact 22 becomes disengaged from stationary upper contact 23. This disconnects the output 26 of single-shot multivibrator 27 from input 28 to the RC circuit 29. Therefore, capacitor 34 charges toward voltage —V, the rate of charge being determined by the time constant of resistor 32 and capacitor 34. This time should be long enough to allow common contact 22 to connect to stationary 24 and allow the bounce of the switch contacts to stop.

After the period of contact bounce, the capacitor should charge to a voltage level negative enough to operate the inverter, causing its output to become positive and fire the single-shot multivibrator 27. The negative pulse output of the multivibrator is then transmitted via common contact 22 and upper stationary contact 23 of each nonoperated switch until transmitted by common contact 22 and lower stationary contact 24 of the operated switch to the output terminal 25 thereof.

Therefore, it is seen that in the steady state, when no switches are operated, the grounded output of single-shot multivibrator 27 is transmitted through common contact 22 and stationary upper contact of each of the switches to inverter 30, and the negative output of the inverter to the input 31 of multivibrator 27. This "down" signal thereby holds multivibrator 27 in its non-triggered state. Operation of any one of the switches disconnects this ground signal from input 28 to RC circuit 29. The multivibrator 27 remains untriggered as the RC circuit fully charges toward voltage —V. During this charging period common contact 22 of the operated switch comes into contact with lower stationary contact 24 and makes connection therewith, undergoing a period of contact bounce. After termination of the contact bounce period, so that common contact is firmly in contact with stationary contact 24, RC circuit 29 charges to a sufficiently negative voltage such that inverter 30 is operated and supplies a positive translation to A.C. input 31, triggering multivibrator 27. The multivibrator thereby provides an output of predetermined duration through the contacts of the operated switch to its output terminal 25.

With the circuit shown in FIGURE 2, if more than one switch is operated at any one time, a signal from multivibrator 27 will appear only on the output terminal 25 of the switch nearest the multivibrator.

Thus, in those cases where multiple switch outputs are required the circuit shown in FIGURE 3 should be used.

Referring to FIGURE 3, the embodiment shown utilizes double-pole, double-throw switches 1 through 5 and an RC network 36, inverter 37 and single-shot multivibrator 38 identical to those described with respect to FIGURE 2.

Each switch includes a push button 39 connected to upper movable contact 40 and lower movable contact 41. Each switch also includes an upper stationary contact 42 and a lower stationary contact 43.

In the normal, non-operated state, push button 39 is up so that upper movable contact 40 is connected to upper stationary contact 42 and lower movable contact 41 is disconnected from stationary lower contact 43. When a switch is operated by depressing push button 39, movable contact 40 first disconnects from upper stationary contact 42 and, later, movable contact 41 contacts, undergoes a period of contact bounce, and then firmly engages lower stationary contact 43.

Upper stationary contact 42 of switch 1 is connected to a ground connection 44. The upper movable contact 40 of switches 1–4 are connected to the upper stationary contact 42 of the subsequent switch. Movable contact 40 of switch 5 is connected to input 45 of RC circuit 36.

The lower movable contacts 41 of every switch are connected together and connected to output 46 of single-shot multivibrator 38. Lower movable contact 43 of each switch is conected to corresponding output terminal 47 for that switch.

In operation, with all switches in the normal condition of contacts 40 and 42 closed and contacts 41 and 43 open, input 45 to RC circuit 36 is connected serially through the normally closed contacts 40 and 42 of the five switches to ground terminal 44. Thus, as described above, RC circuit 36 holds the input to inverter 37 at ground potential, thereby preventing triggering of a single-shot multivibrator 38. The output of the multivibrator 38 therefore remains at ground potential.

Upon depressing push button 39 of one or a plurality of switches, contacts 40 and 42 of those switches are opened, thereby breaking the connection from input 45 of RC circuit 36 to ground terminal 44. As above, the RC circuit begins to charge to voltage —V, driving the input to inverter 37 negative. The negative voltage, however, does not become sufficiently negative to cause inverter 37 to trigger multivibrator 38 until after a period of time determined by the time constant of RC network 36.

During this time, movable contact 41 of the operated switch or switches comes in contact with lower stationary contact 43 thereof. No potential exists on contact 41 during this time since multivibrator 38 is not triggered. Thus, with no potential thereacross, contacts 41 and 43 of the operated switch or switches, meet, undergo a period of contact bounce, and then are firmly closed without transmission of current therebetween.

Then, RC circuit 36 charges sufficiently toward voltage —V that inverter 37 operates and provides a positive translation to trigger single-shot multivibrator 38. The single-shot then fires, providing an output pulse of predetermined amplitude and duration on output line 46. This pulse is provided to movable contact 41 of all switches. The pulse is transmitted by contacts 41 and 43 of those switches which have been operated to the corresponding output terminals 47.

Upon termination of the pulse from multivibrator 38, output 46 returns to ground potential. Upon subsequent release of the operated switches, contacts 41 and 43 thereof are opened and contacts 40 and 42 thereof closed. Input 45 to RC circuit 36 is thereby reconnected serially through contacts 40 and 42 to all of the switches through ground terminal 44. Thus, the system resumes the steady state condition ready for operation of one or a plurality of the switches 1 through 5.

It is thus seen that various combinations and permutations of switching contacts may be made utilizing the basic concept disclosed with respect to FIGURE 1 to supply various types of outputs. Additionally, different types of circuit arrangements may be made to accomplish the delay and voltage supply functions as described with respect to FIGURE 1. The circuitry shown in FIGURES 1, 2 and 3 comprise merely examples thereof and other examples employing the disclosed concept will become obvious to those skilled in the art.

Referring to FIGURES 2 and 3, single-shot multivibrator 27 or 38 may be provided with external gate inputs 47 and 48. Such an external gate may normally be grounded, preventing operation of the single-shot multivibrator even though the output of inverter 30 or 37 reaches a sufficient voltage to otherwise trigger the multivibrator. Triggering of the multivibrator then occurs only upon application of a specified positive voltage to the external gate at the time of triggering of the multivibrator.

Such an arrangement of an external gate may assume many forms obvious to those skilled in the art. For example, the external gate may comprise the power supply to the multivibrator 27 or 38. Thus, without application of a positive voltage comprising the power supply to the external gate, operation of the multivibrator is prevented.

Such an external gate may be useful as a clock for timing the operation of the multivibrator, and therefore control the timing of the resultant pulse on the operated switch 1 through 5 of FIGURE 2 and the pulses appearing at the output of operated switches 1 through 5 of FIGURE 3.

Another important use of the external gate is to provide the capability to easily inhibit the output of the switches when desired.

Other uses for such an external gate are apparent to those skilled in the art.

Suitable single shot multivibrators 27 and 38 are illustrated in Computer Handbook, Huskey and Korn, McGraw-Hill Book Company, Sec. 11–12, FIGURE 11.22(*b*). The inverters 30 and 37 are illustrated in Computer Handbook, Huskey and Korn, McGraw-Hill Book Company, Sec. 11–6, FIGURES 11.10 and 11.11. A suitable delay for delay 17 is illustrated in FIGURE 2 by resistor 32 and capacitor 34, etc. Suitable inverters are also illustrated in Computer Handbook, Huskey and Korn, McGraw-Hill Book Company, Sec. 11.10, FIGURES 11.18 and 11.19.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a switching apparatus having a set of contact points, apparatus comprising:

sensing means for sensing the impending closing of said contact points, signal means responsive to said sensing means for supplying an electrical signal to one of said contact points a predetermined time after the operation of said sensing means, said sensing means comprises a second set of contact points operated simultaneously with said first set of contact points such that said second contact points are closed when said first set of contact points are fully opened and said second contact points open as said first contact points begin to close, said signal means is responsive to said opening of said second set of contact points, said signal means comprises a single shot multivibrator having an output terminal connected to one of said contact points and an operating input, and an RC timing network connected to said operating input of said single shot multivibrator, which network is responsive to the opening of said second set of contact points to provide a signal to said operating input after a predetermined time.

2. A switching apparatus for selectively switching a signal comprising a signal source, delay means, a plurality of pairs of switching contacts, each of said pairs selectively movable from a closed to an open position, said pairs connected in series and to the input of said delay means, a plurality of output contacts, one for each of said pair of switching contacts, operatively connected to said signal source in response to opening of the corresponding pair of switching contacts, said delay means responsive to the opening of one of said pairs of switching contacts to actuate said signal source providing an output signal to the corresponding output terminal a predetermined time after the opening of the corresponding switching contacts.

3. Switching system as set forth in claim 2 wherein one of said switching contacts of each of said pair of switching contacts is movable with respect to the other switching contact from a closed to an open position in contact with the corresponding output terminal.

4. A switching system as set forth in claim 2 comprising a set of power contacts all connected to said signal source and movable from an open to closed position in response to a corresponding pair of said switching contact opening.

5. A switching system as set forth in claim 4 wherein each of said power contacts is movable with a corresponding pair of said switching contacts from an open to a closed position relative to a corresponding output contact as said corresponding pair of said switching contacts moves from a closed to an open position.

References Cited

UNITED STATES PATENTS

| | | | |
|---|---|---|---|
| 2,425,570 | 8/1947 | Scheg et al. | 317—11.1 |
| 2,441,789 | 5/1948 | Bivens | 317—11.1 |
| 3,122,659 | 2/1964 | Krestel et al. | 307—136 |
| 3,184,619 | 5/1965 | Zydney | 307—136 X |
| 3,192,468 | 6/1965 | Buchanan et al. | 323—22 |
| 3,209,228 | 9/1965 | Gawron | 323—22 |
| 3,230,394 | 1/1966 | Kintner | 307—136 |
| 3,376,428 | 4/1968 | Nugent | 307—136 |

ROBERT K. SCHAEFER, *Primary Examiner.*

T. B. JOIKE, *Assistant Examiner.*

U.S. Cl. X.R.

317—11